(12) United States Patent
Iwashita et al.

(10) Patent No.: US 7,932,689 B2
(45) Date of Patent: Apr. 26, 2011

(54) MOTOR DRIVE SYSTEM FOR DRIVING MOTOR PROVIDED WITH A PLURALITY OF WINDINGS

(75) Inventors: Yasusuke Iwashita, Yamanashi (JP); Tadashi Okita, Yamanashi (JP); Yukio Toyozawa, Yamanashi (JP); Kazuomi Maeda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/643,270

(22) Filed: Dec. 21, 2009

(65) Prior Publication Data

US 2010/0219787 A1 Sep. 2, 2010

(30) Foreign Application Priority Data

Mar. 2, 2009 (JP) .................................. 2009-048337

(51) Int. Cl.
G05B 11/01 (2006.01)
(52) U.S. Cl. .......................... 318/560; 318/599; 318/600
(58) Field of Classification Search .................. 318/560, 318/569, 599, 600, 628, 652, 690, 700, 400.01, 318/400.14, 721, 727, 779, 799, 801, 803, 318/811, 430, 437, 574; 388/819, 829
See application file for complete search history.

(56) References Cited

U.S. PATENT DOCUMENTS

| | | | | |
|---|---|---|---|---|
| 4,970,449 A * | 11/1990 | Kawamura et al. | ............ | 318/569 |
| 5,256,951 A * | 10/1993 | Nashiki et al. | ................ | 318/575 |
| 6,147,469 A * | 11/2000 | Uchida et al. | ................ | 318/675 |
| 6,462,301 B1 * | 10/2002 | Scott et al. | ............... | 219/121.67 |
| 6,470,225 B1 * | 10/2002 | Yutkowitz | ....................... | 700/44 |
| 6,563,283 B2 * | 5/2003 | Iwashita et al. | ............... | 318/599 |
| 6,999,844 B2 * | 2/2006 | Endo | .............................. | 700/188 |
| 7,024,271 B2 * | 4/2006 | Ogino et al. | .................. | 700/177 |
| 7,463,003 B2 * | 12/2008 | Toyonaga et al. | ............. | 318/625 |

FOREIGN PATENT DOCUMENTS

| | | |
|---|---|---|
| JP | 10313591 A | 11/1998 |
| JP | 2005-086918 A | 3/2005 |
| JP | 2007254095 A | 10/2007 |
| JP | 2007295647 A | 11/2007 |

OTHER PUBLICATIONS

Notice of Reasons for Rejection for Japanese Application No. 2009-048337 issued May 18, 2010.

* cited by examiner

Primary Examiner — Walter Benson
Assistant Examiner — Antony M Paul
(74) Attorney, Agent, or Firm — Lowe Hauptman Ham & Berner LLP

(57) ABSTRACT

A motor drive system is provided with a plurality of axis control parts for outputting PWM commands using a position command, a plurality of current supply parts which supply current to the respective windings based on the PWM commands of the respective axis control parts, and which are connected to the respective windings, a motor position detector for outputting a signal of a rotor position of the motor, a first signal supply part for supplying the output signal to one current supply part of the plurality of current supply parts, and a second signal supply part for supplying the signal supplied through the first signal supply part to an axis control part corresponding to one current supply part, and the corresponding axis control part outputs a PWM command based on the signal supplied from the one current supply part through the second signal supply part to the corresponding axis control part and the position command, and the remaining axis control part outputs the PWM command based on the signal supplied from the corresponding axis control part to the remaining axis control parts and the position command. Thereby, a motor drive system capable of driving a plurality of inverters can be made simple.

1 Claim, 5 Drawing Sheets

MOTOR DRIVE SYSTEM FOR DRIVING MOTOR PROVIDED WITH A PLURALITY OF WINDINGS

RELATED APPLICATIONS

The present application is based on, and claims priority from, Japanese Application Number 2009-048337, filed Mar. 2, 2009, the disclosure of which is hereby incorporated by reference herein in its entirety.

BACKGROUND OF THE INVENTION

1. Field of the Invention

The present invention relates to a motor drive system for driving a motor provided with a plurality of windings.

2. Description of the Related Art

In the case of drive controlling a large motor with high torque and huge power by an inverter device (servo amplifier), a large capacity inverter device is required. However, because there are limitations in regards to the elements constituting the inverter device, it is difficult to configure one inverter device which controls a large motor. Therefore, as disclosed in Japanese Unexamined Patent Publication (Kokai) No. 2005-86918, in general, a plurality of small capacity inverter devices which are connected in parallel are used as an alternative.

FIG. 4 shows a block diagram of one of the conventional motor drive systems as disclosed in Japanese Unexamined Patent Publication (Kokai) No. 2005-86918. The motor drive system 100 shown in FIG. 4 mainly comprises a large motor 110 provided with a plurality of windings, a motor position detector 120 for detecting a position of a rotor of the motor 110, and an amplifier group 140 including a plurality of amplifiers 200a to 200n which are linked together with each other. Further, the amplifiers 200a to 200n include respective inverters 210a to 210n.

As shown in the figure, the motor 110 is connected to each of the amplifiers 200a to 200n by power line cables 400a to 400n. Further, a position feedback cable 410 extending from the motor position detector 120 is branched in midstream and connected to all of the amplifiers 200a to 200n.

In addition, the motor drive system 100 includes a numerical control device 130. In the numerical control device 130, axis position commands of the motor 110 generated by a main processor 300 are input to the axis control parts 310a to 310n. The axis control parts 310a to 310n generate PWM (pulse width modulation) commands (voltage commands) and supply the commands to one amplifier 200a through a serial bus control circuit 320 and a serial communication cable 420. Because the amplifiers 200a to 200n are mutually connected, the inverters 210a to 210n of the respective amplifiers 200a to 200n drive the motor 110 based on the PWM commands.

However, as shown in FIG. 4, when a single motor 110 is driven, only a single rotor position detection signal can be obtained. Therefore, in the prior arts, in order to supply the single rotor position detection signal to all of the amplifiers 200a to 200n, the position feedback cable 410 must be branched to all of the amplifiers 200a to 200n. The wiring operation of this kind of position feedback cable 410 is complicated, requires a large effort and time, and is costly.

Further, FIG. 5 shows a block diagram showing another conventional motor drive system. The motor drive system 100' shown in FIG. 5 is different from the motor drive system 100 shown in FIG. 4 in the point that the axis control parts 310a to 310n are included in the respective amplifiers 200a to 200n. Even in the motor drive system 100' shown in FIG. 5, only a single rotor position detection signal can be obtained. Thus, similar to the aforementioned system, the position feedback cable 410 must be branched to all the amplifiers 200a to 200n.

The present invention has been created considering the above drawbacks, and an object of the present invention is to provide a motor drive system capable of driving a large capacity motor by a plurality of inverter parts without complicating the configuration.

SUMMARY OF THE INVENTION

In order to attain the above object, a first aspect provides a motor drive system for driving a motor provided with a plurality of windings, comprising a numerical control device for outputting a position command, a plurality of axis control parts for outputting PWM commands using the position command, a plurality of current supply parts which supply current to the respective windings based on the respective PWM commands of the respective axis control parts, and which are connected to the respective windings, a motor position detector for detecting a rotor position of the motor, and outputting a rotor position detection signal, a first signal supply part for supplying the rotor position detection signal output from the motor position detector to one current supply part of the plurality of current supply parts, and a second signal supply part for supplying the rotor position detection signal supplied through said first signal supply part to the axis control part corresponding to said one current supply part, wherein the corresponding axis control part outputs the PWM command based on the rotor position detection signal supplied from said one current supply part through the second signal supply part to the corresponding axis control part and the position command, and the remaining axis control parts output the PWM commands based on the rotor position detection signal supplied from the corresponding axis control part to the remaining axis control parts and the position command.

According to a second aspect, each of the plurality of axis control parts is incorporated in the numerical control device as in the first aspect.

According to a third aspect, the plurality of axis control parts are incorporated in the corresponding current supply parts, respectively, as in the first aspect.

According to a fourth aspect, each of the plurality of axis control parts includes a selection part for selecting whether the rotor position detection signal supplied to said one current supply part is to be used, or the rotor position detection signal supplied to the remaining axis control parts is to be used, as in any of the first to third aspect.

These and other objects, features and advantages of the present invention will be more apparent in light of the detailed description of exemplary embodiments thereof as illustrated by the drawings.

DETAILED DESCRIPTION

Figure 1:
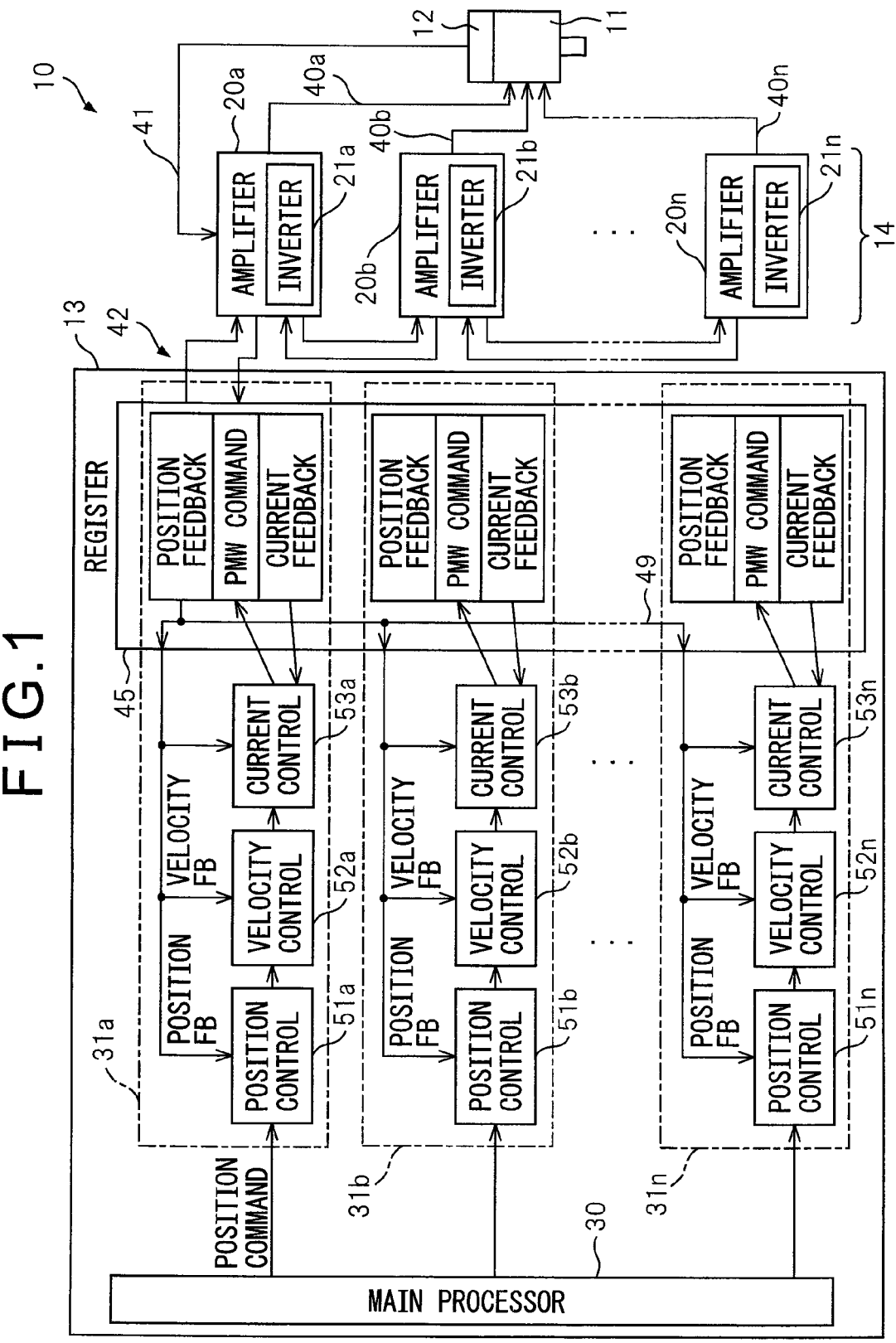
FIG. 1 shows a block diagram of a motor drive system according to the first embodiment of the present invention.

Hereinbelow, the embodiments of the present invention will be explained with reference to the attached drawings. In the drawings below, the same reference numeral is assigned to the same member. The scale sizes of the drawings are appropriately changed for easy understanding.

FIG. 1 shows a block diagram of a motor drive system according to the first embodiment of the present invention. A motor drive system 10 shown in FIG. 1 comprises a large motor 11 provided with a plurality of windings, a motor position detector 12, for example, a rotary coder, which detects the position of a rotor of the motor 11 and outputs a rotor position detection signal, and an amplifier group 14 including a plurality of amplifiers 20a to 20n which are linked together with each other.

The amplifiers 20a to 20n include respective inverters 21a to 21n. These inverters 21a to 21n are respectively connected to the plurality of wirings of the motor 11. The amplifiers 20a to 20n together with the inverters 21a to 21n, or the amplifiers 20a to 20n by themselves serve as current supply parts to flow the current to the plurality of windings of the motor 11.

As illustrated, power line cables 40a to 40n extending from the respective amplifiers 20a to 20n are connected to the windings of the motor 11, respectively. Further, a position feedback cable 41 extending from the motor position detector 12 is connected to only a single amplifier 20a of the amplifier group 14.

In addition, the motor drive system 10 includes a numerical control device 13. In the numerical control device 13, an axis position command of the motor 11 generated by a main processor 30 is input to the axis control parts 31a to 31n. The axis control parts 31a to 31n generate PWM commands (voltage commands) and supply the commands to one amplifier 20a through a serial communication cable 42. Because the amplifiers 20a to 20n are mutually connected, the inverters 21a to 21n of the respective amplifiers 20a to 20n drive the motor 11 based on the PWM commands. Accordingly, the motor drive system 10 of the present invention can drive the large motor 11 by the plurality of inverters 21a to 21n.

As shown in FIG. 1, each of the axis control parts 31a to 31n includes a register 45. The register 45 can resister a position feedback, PWM command, current feedback, respectively. The position feedback, the PWM command, and the current feedback are updated at a predetermined cycle.

Here, the position feedback is a position feedback value of the rotor of the motor 11 which is a rotor position detection signal of the motor position detector 12. In the present invention, the position feedback is registered to the register 45 through the position feedback cable 41, the amplifier 20a, and the serial communication cable 42. The amplifier 20a corresponds to the axis control part 31a, and thus, in the present invention, only the position feedback for the axis control part 31a is registered to the register 45. Note that the current feedback is a current feedback value supplied from each of the amplifiers 20a to 20n.

As can be seen from FIG. 1, each of the axis control parts 31a to 31n includes respective position control parts 51a to 51n, velocity control parts 52a to 52n, and current control parts 53a to 53n. The position control part 51a of the axis control part 31a obtains a position deviation by subtracting the position feedback registered in the register 45 from the position command generated by the main processor 30. Then, the position control part 51a obtains a velocity command value by multiplying the position deviation by a position loop gain.

The velocity control part 52a obtains a velocity deviation by subtracting a velocity feedback value calculated based on the position feedback of the register 45 from the velocity command value. Then, the velocity control part 52a performs proportional-integral control in regards to the velocity deviation to obtain a current command value. Thereafter, the current control part 53a generates a PWM command based on a current deviation obtained by subtracting the current feedback in the register 45 from the current command value, and register the PWM command to the register 45. The PWM command registered to the register 45 is supplied to the amplifier 20a through the serial communication cable 42.

The remaining axis control parts 31b to 31n have almost the same configurations as the above-mentioned configuration. However, as can be seen from FIG. 1, these axis control parts 31b to 31n do not use their exclusive position feedbacks, but use the same position feedback as the position feedback of the axis control part 31a. In other words, the axis control parts 31b to 31n read the position feedback in the register 45 of the axis control part 31a, and use it as position feedbacks for the axis control parts 31b to 31n themselves. In other words, in the present invention, a single position feedback is shared and used by all the axis control parts 31a to 31n.

Figure 2:
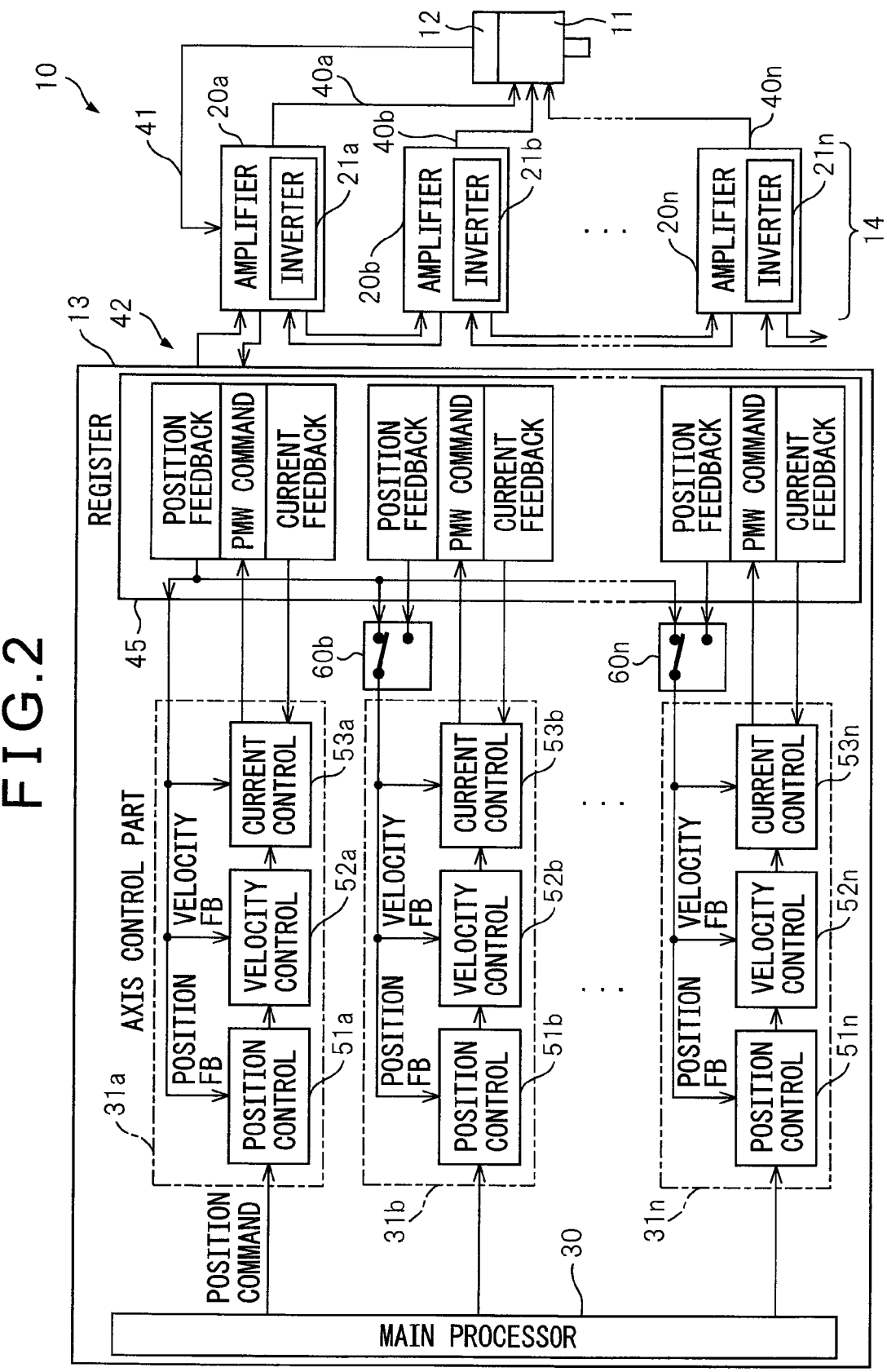
FIG. 2 shows another block diagram of a motor drive system according to the first embodiment of the present invention.

To this end, the axis control parts 31b to 31n may include reading means for reading the position feedback in the register 45 of the axis control part 31a and/or duplicating means for duplicating the position feedback of the axis control part 31a. Alternatively, the motor drive system 10 according to the present invention may include a position feedback supply part, such as a signal line 49, which supplies the position feedback in the register 45 of the axis control part 31a to other axis control parts 31b to 31n. In addition, as shown in FIG. 2, axis control parts 31b to 31h may be provided with switches 60b to 60n for switching between the position feedbacks of the amplifiers 20b to 20n and the position feedback of the amplifier 20a in the register 45.

Therefore, in the present invention, if the motor position detector 12 and the amplifier 20a are connected by a single position feedback cable 41, all the axis control parts 31a to 31n can use a common position feedback. Accordingly, in the present invention, it is not necessary to branch the position feedback cable or use a plurality of position feedback cables in order to connect the motor position detector 12 to the remaining amplifiers 20b to 20n. Thus, the present invention can provide a motor drive system 10 capable of driving a large motor by a plurality of inverter parts without complicating the configuration. Further, in FIG. 1, the current command value output from one velocity control part can be supplied to the remaining current control parts. Thereby, the remaining position control parts and the velocity control parts can be omitted, and the processing time can be shortened.

Figure 3:
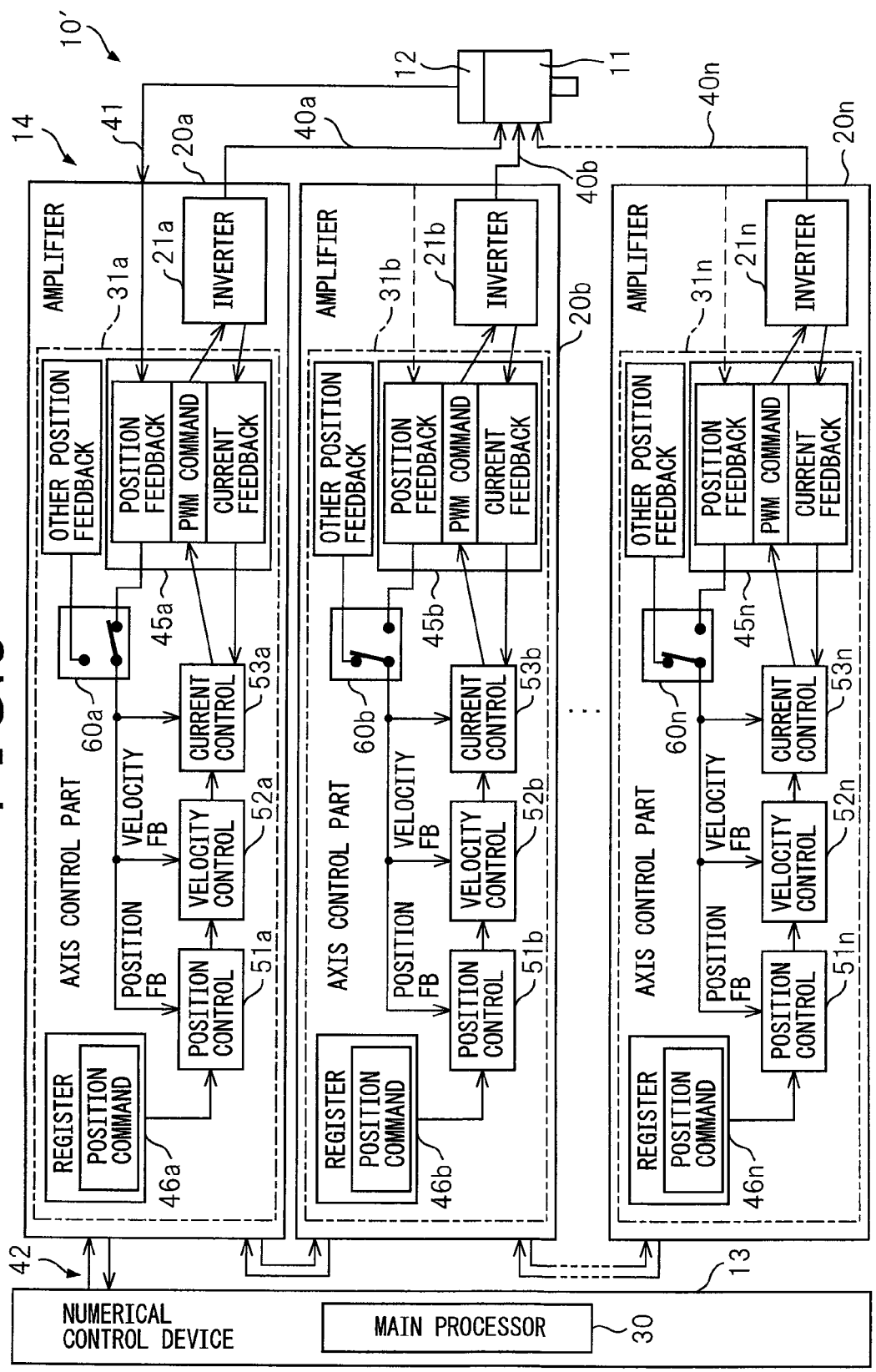
FIG. 3 shows a block diagram of a motor drive system according to the second embodiment of the present invention.
Figure 4:
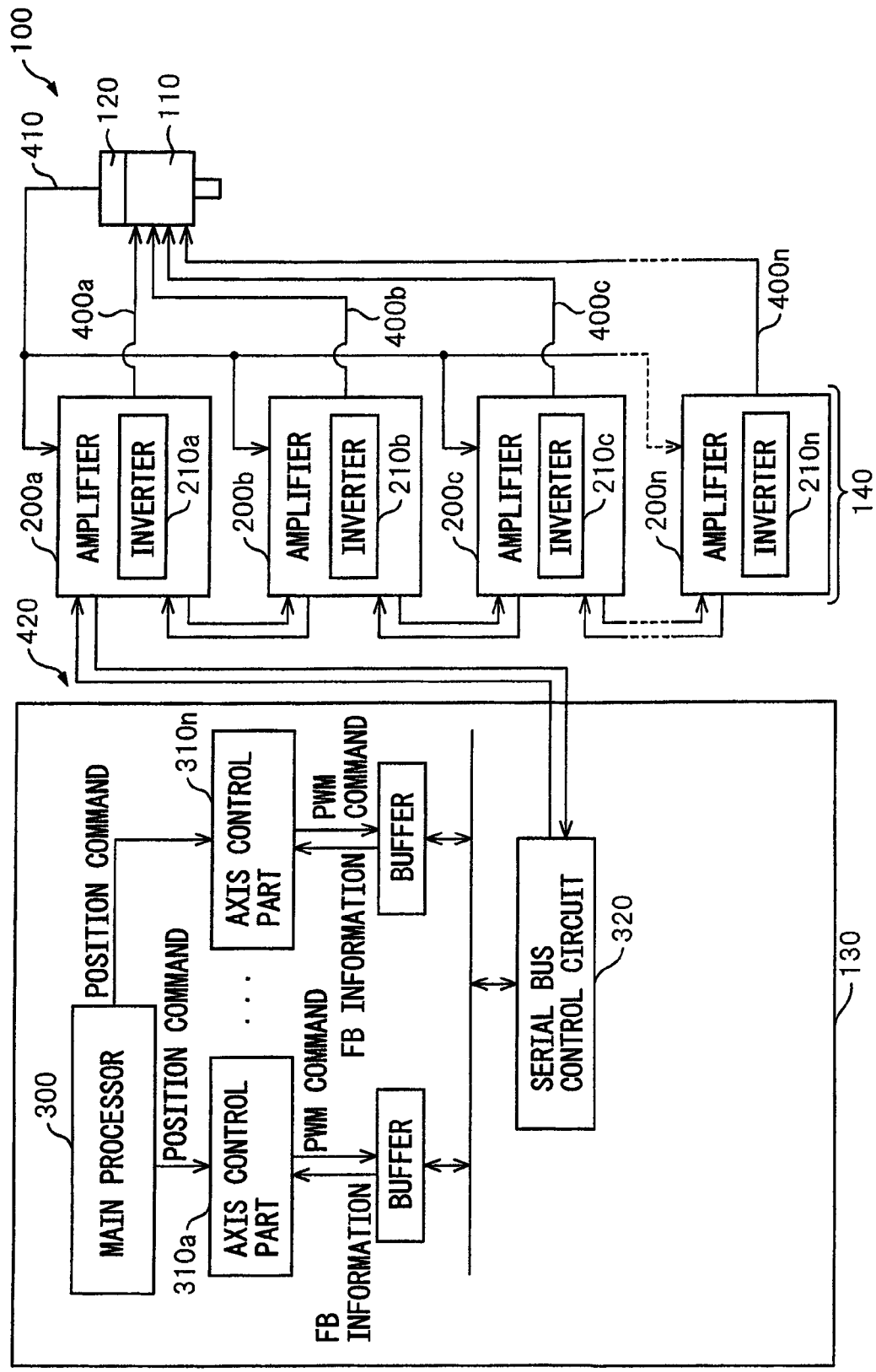
FIG. 4 shows a block diagram of one of the conventional motor drive systems.
Figure 5:
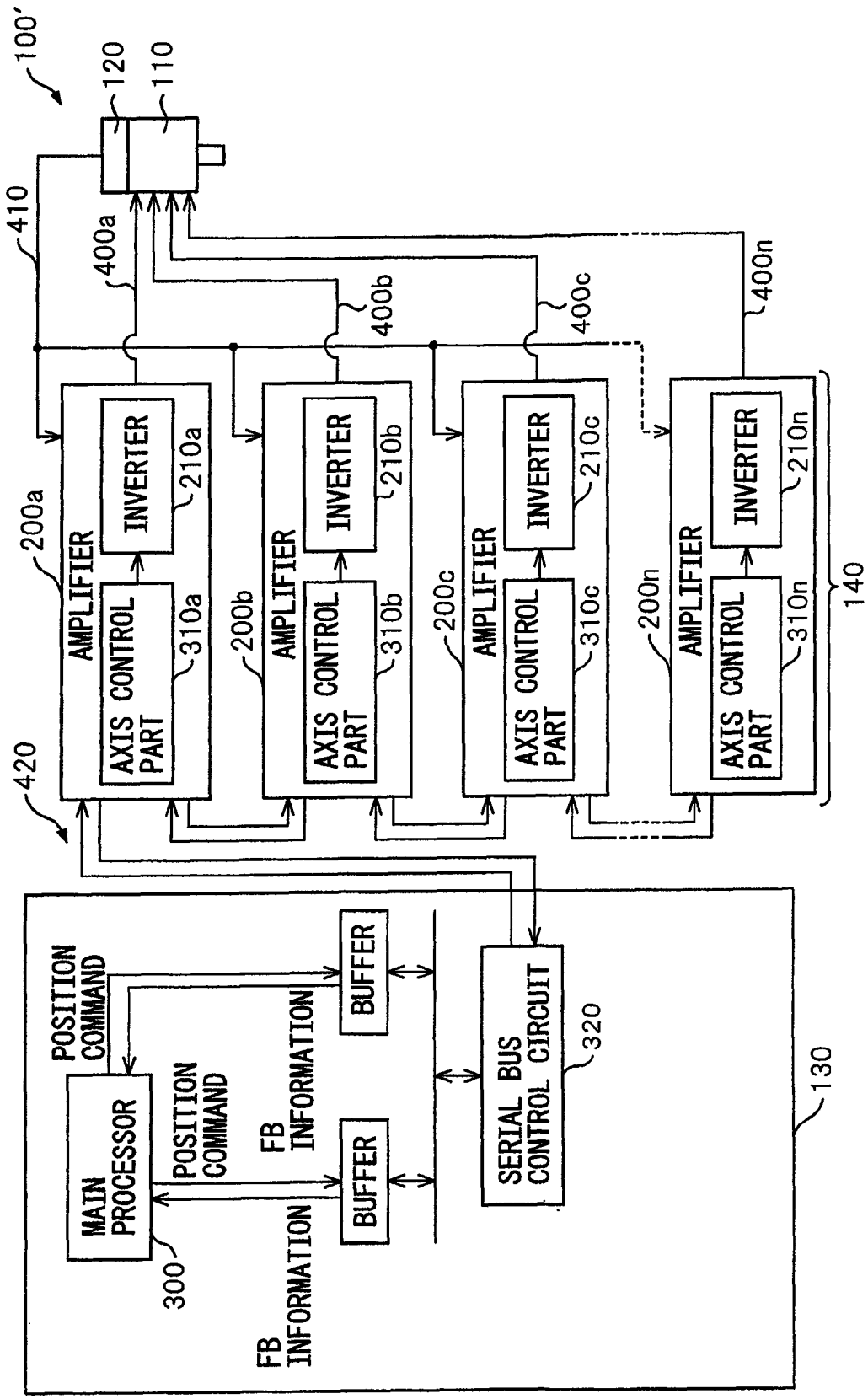
FIG. 5 shows a block diagram of another conventional motor drive system.

FIG. 3 shows a block diagram of a motor drive system according to the second embodiment of the present invention. In FIG. 3, the same number is assigned to the similar member mentioned above, and the explanation therefor is omitted for the purpose of conciseness. The motor drive system 10' shown in FIG. 3 is different from the motor drive system 10 shown in FIG. 1 in the point that each of the axis control parts 31a to 31n is included in corresponding amplifiers 20a to 20n. It can be understood that the almost same effect as the above mentioned effect can be obtained in this case. Note that in the embodiment shown in FIG. 3, the position commands generated by the main processor 30 of the numerical control device 13 are registered once to the respective registers 46a to 46n.

In this connection, in FIG. 3, the axis control parts 31a to 31n are provided with respective switches 60a to 60n between the registers 45a to 45n and the current control parts 53a to 53n. These switches 60a to 60n switch the position feedbacks registered in the registers 45a to 45n to the position feedbacks read from other axis control parts 31a to 31n. In other words, operating the switches 60a to 60n enables the selection of the position feedback which is to be used.

In FIG. 3, the feedback cable 41 is connected to the axis control part 31a of the amplifier 20a. Accordingly, the switch 60a of the axis control part 31a is set so that the axis control part 31a uses the position feedback which serves as a rotor position detection signal. The switches 60b to 60n of the remaining axis control parts 31b to 31n are set to use the position feedback in the register 45a of the axis control part 31a.

Here, if the connection of the position feedback cable 41 shown in FIG. 3 is switched from the amplifier 20a to, for example, the amplifier 20b, the switch 60b of the axis control part 31b is set so that the axis control part 31b uses the position feedback as a rotor position detection signal. The switch 60a of the axis control part 31a is set to use the position feedback in the register 45b of the axis control part 31b. Accordingly, the switches 60a to 60n are particularly advantageous when a position command from other axis control parts is required, and vice versa.

Alternatively, the switching operation of the switches 60a to 60n can be determined to correspond to, for example, specifications of a motor. In this case, when the motor 11 is changed to another motor, for example, a larger motor, the switches 60a to 60n can be automatically set corresponding to the new motor.

EFFECT OF THE INVENTION

In the first aspect, it is sufficient to connect the motor position detector to one current supply part by a single first signal supply part, for example, a position feedback cable. In other words, it is not necessary to connect a plurality of current supply parts to the motor detector by a plurality of first signal supply parts. Accordingly, a motor drive system having a simple configuration can be provided. Thereby, a large motor can be driven by a plurality of power supply parts without complicating the configuration.

In the second aspect, if each of the plurality of axis control parts is integrated in the numerical control device, the configuration of the motor drive system can be made comparatively simple.

In the third aspect, if the plurality of axis control parts are integrated in the corresponding current supply parts, respectively, the configuration of the motor drive system can be made simple.

The fourth aspect is advantageously applied when a rotor position detection signal from other axis control part is required, in place of the detected rotor position detection signal, and vice versa. Note that the selection part can be, for example, a switch.

Although the invention has been shown and described with exemplary embodiments thereof, it should be understood by those skilled in the art that the foregoing and various other changes, omissions and additions may be made therein and thereto without departing from the scope of the invention.

The invention claimed is:

1. A motor drive system for driving a motor provided with a plurality of windings, comprising
    a numerical control device for outputting a position command,
    a plurality of axis control parts for outputting PWM commands using the position command, each of the plurality of axis control parts is incorporated in the numerical control device,
    a plurality of current supply parts which supply current to the respective windings based on the respective PWM commands, and which are connected to the respective windings,
    a motor position detector for detecting a rotor position of the motor, and outputting a rotor position detection signal,
    a first signal supply part for supplying the rotor position detection signal output from the motor position detector to one current supply part of the plurality of current supply parts, and
    a second signal supply part for supplying the rotor position detection signal supplied through said first signal supply part to the axis control part corresponding to said one current supply part,
    wherein the corresponding axis control part outputs a PWM command based on the rotor position detection signal supplied from said one current supply part through the second signal supply part to the corresponding axis control part and the position command,
    the remaining axis control parts output a PWM commands based on the rotor position detection signal supplied from the corresponding axis control part to the remaining axis control parts and the position command, and
    wherein each of the plurality of axis control parts includes a selection part for selecting whether the rotor position detection signal supplied to said one current supply part is to be used, or the rotor position detection signal supplied to the remaining axis control parts is to be used.

* * * * *